US007454286B2

(12) United States Patent
Sinnamon et al.

(10) Patent No.: US 7,454,286 B2
(45) Date of Patent: Nov. 18, 2008

(54) COMBUSTION CONTROL IN AN INTERNAL COMBUSTION ENGINE

(75) Inventors: James F. Sinnamon, Birmingham, MI (US); Mark C. Sellnau, Bloomfield Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 42 days.

(21) Appl. No.: 11/642,305

(22) Filed: Dec. 20, 2006

(65) Prior Publication Data

US 2008/0154450 A1 Jun. 26, 2008

(51) Int. Cl.
*F02D 41/14* (2006.01)
*G06F 19/00* (2006.01)
*G01M 15/00* (2006.01)

(52) U.S. Cl. .................... 701/110; 701/102; 73/114.16; 123/435

(58) Field of Classification Search ................ 123/435, 123/568.17, 568.22; 701/20, 101, 102, 106, 701/110, 114, 115; 73/35.12, 35.13, 114.16
See application file for complete search history.

(56) References Cited

U.S. PATENT DOCUMENTS 5,806,490 A * 9/1998 Nogi et al. .................. 123/435
5,931,140 A * 8/1999 Maloney ..................... 123/480
6,785,604 B2 * 8/2004 Jacobson .................... 701/114
7,143,580 B2 * 12/2006 Ge ............................ 60/605.1
7,195,007 B2 * 3/2007 Muto et al. ............ 123/568.22
7,207,316 B2 * 4/2007 Moriya et al. ............... 123/435
7,363,911 B2 * 4/2008 Brehob .................. 123/406.47

* cited by examiner

*Primary Examiner*—Willis R. Wolfe, Jr.
*Assistant Examiner*—Johnny H. Hoang
(74) *Attorney, Agent, or Firm*—David P. Wood

(57) ABSTRACT

The present invention relates to: self-tuning engine control algorithms using inputs from transducers that measure pressure in the engine cylinders, and from an engine crankshaft rotational position sensor; methods of processing the input signals to "self-tune" or learn accurate values for a) pressure transducer voltage offset, b) crank position encoder error and c) engine compression ratio; improved pressure-ratio-based algorithms for calculating cylinder heat release fraction as a function of crank angle.

9 Claims, 12 Drawing Sheets

Engine System

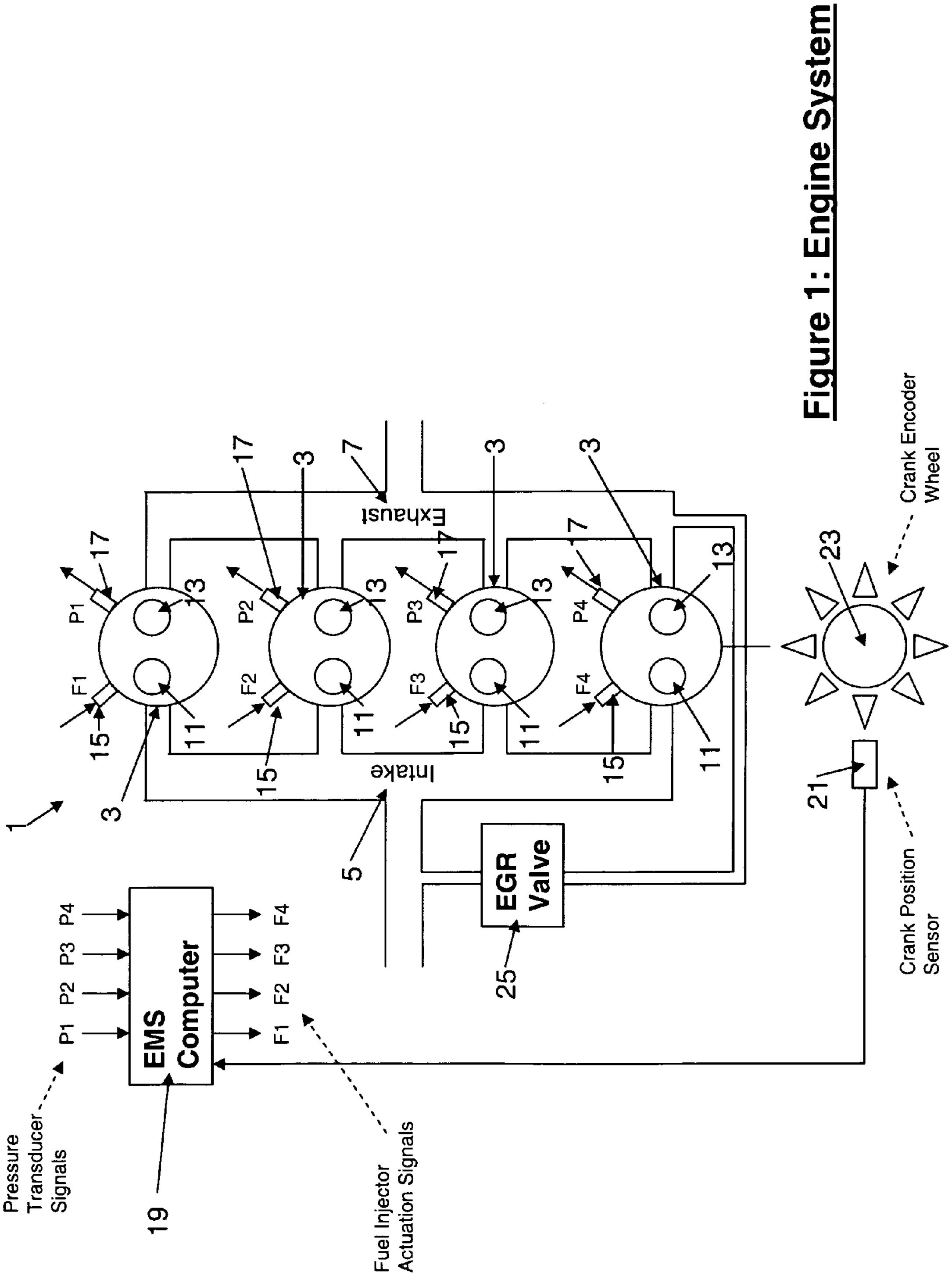
Figure 1: Engine System

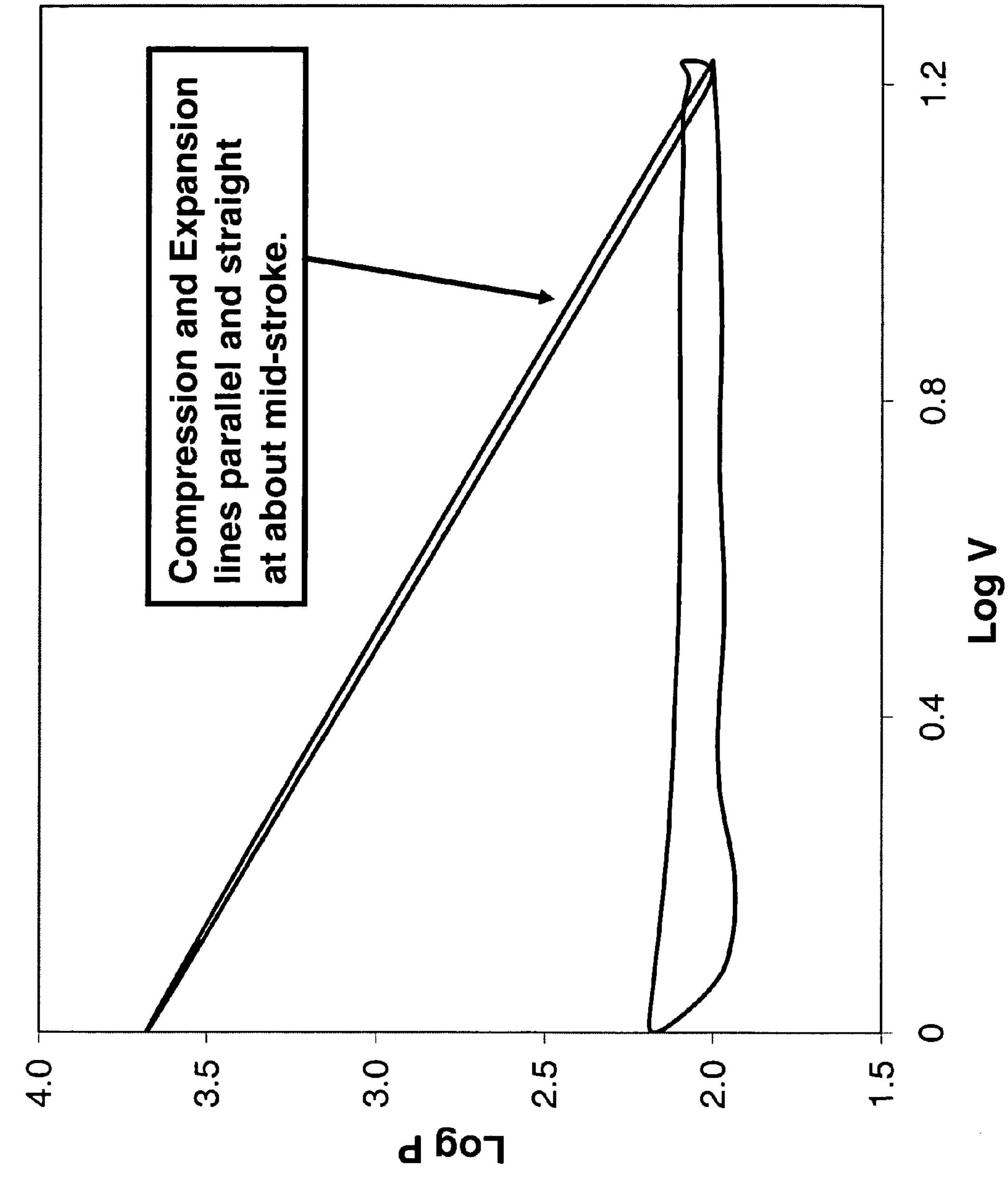
Figure 2 - Log P vs. Log V Plot, DI Diesel, Motoring, 2000 RPM

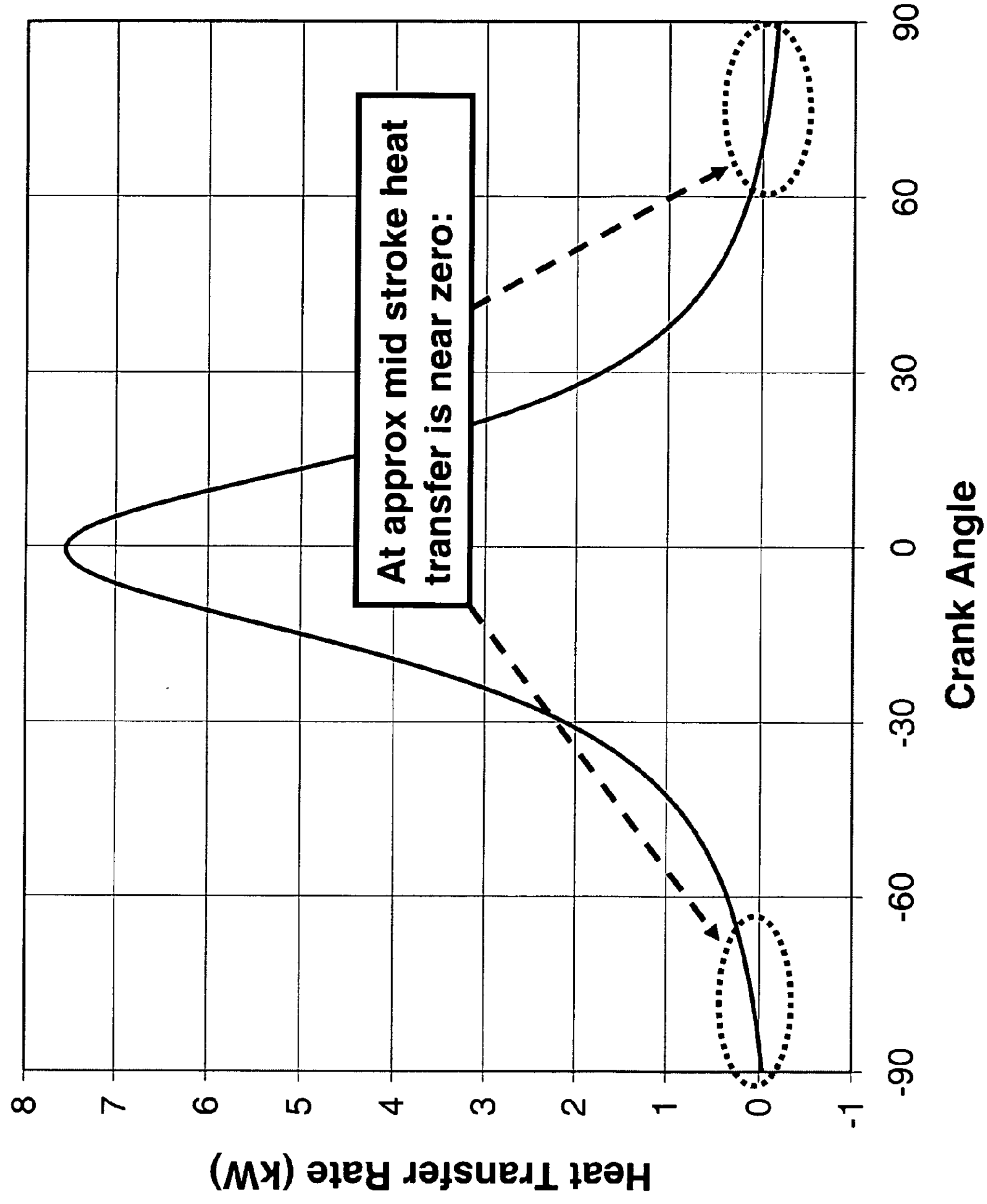
Figure 3 - Heat Transfer, DI Diesel, Motoring, 2000 RPM

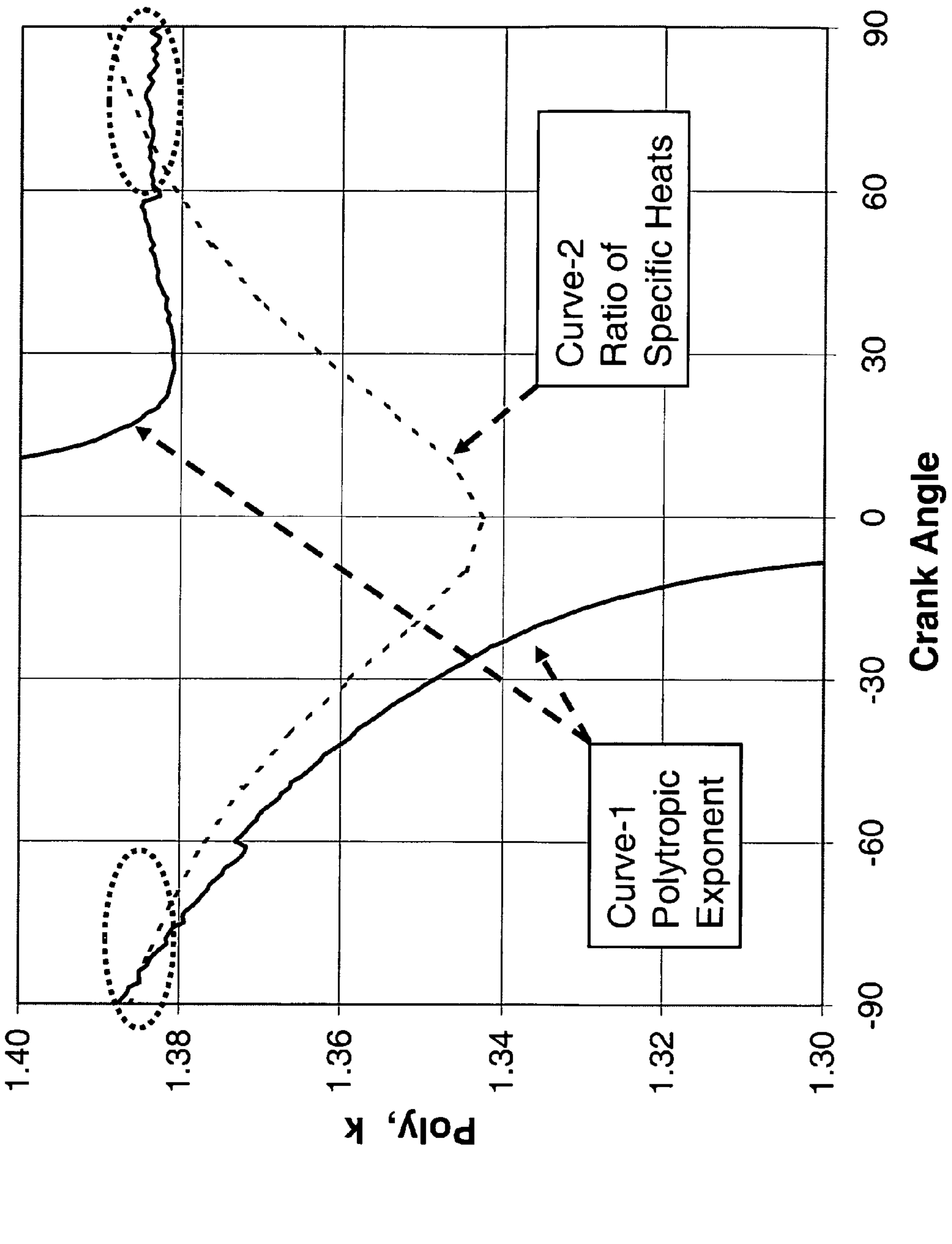
Figure 4 - Specific Heat Ratio and Polytropic Exponent, DI Diesel, Motoring, 2000 RPM

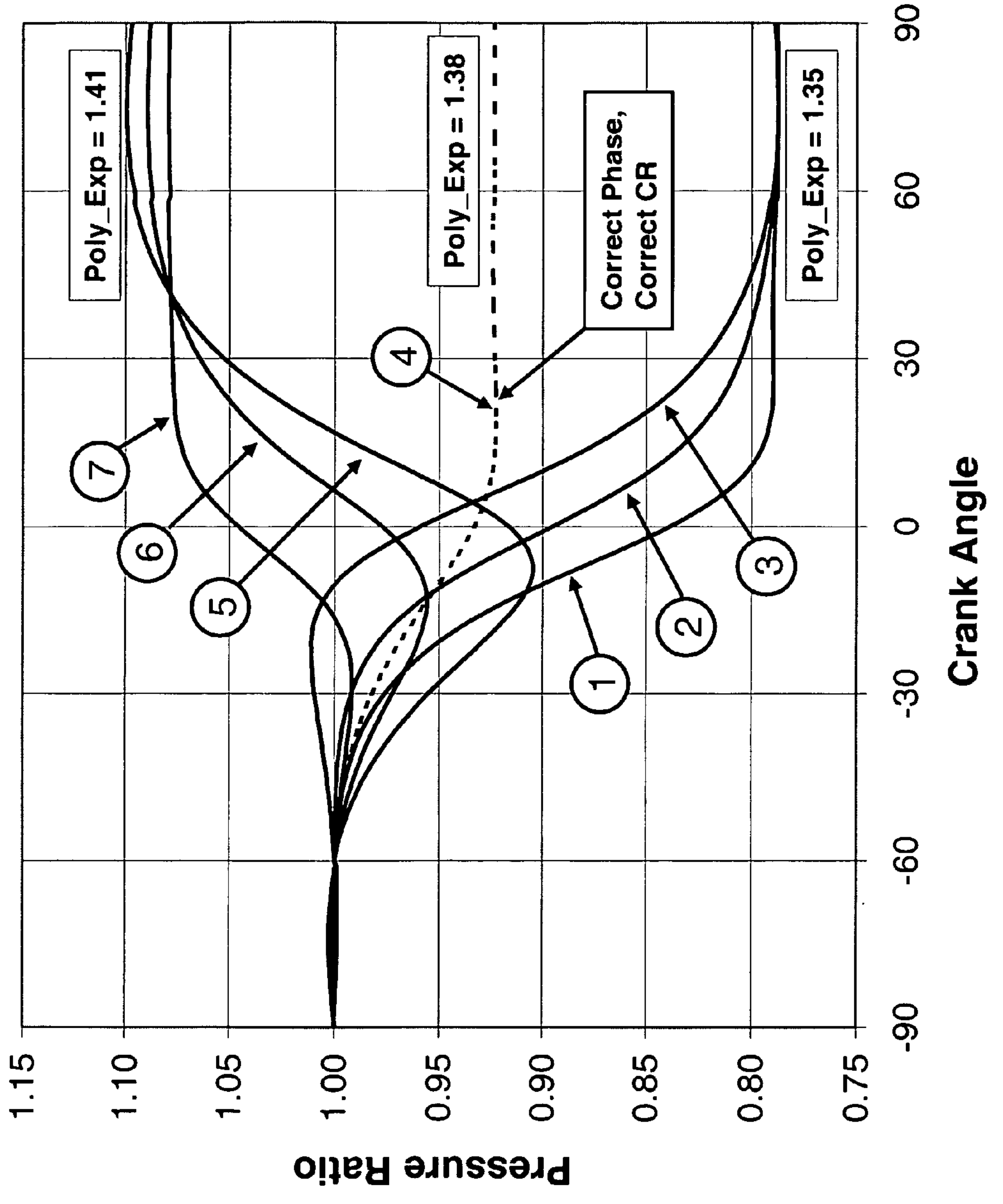
Figure 5 - Effect of Phase and Compression Ratio Errors on Pressure Ratio, DI Diesel, Motoring, 2000 RPM

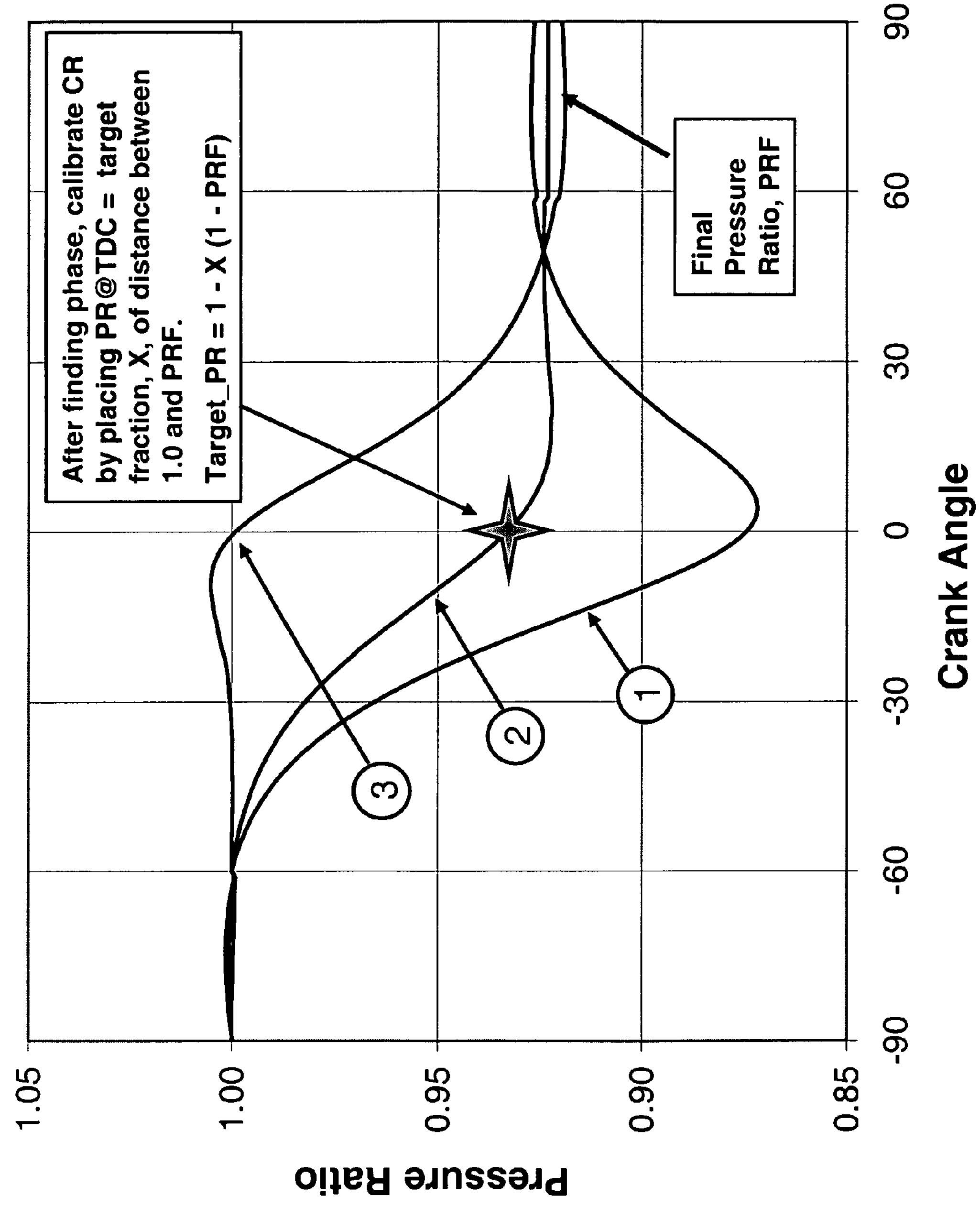
Figure 6 - Self-Tuning for Compression Ratio

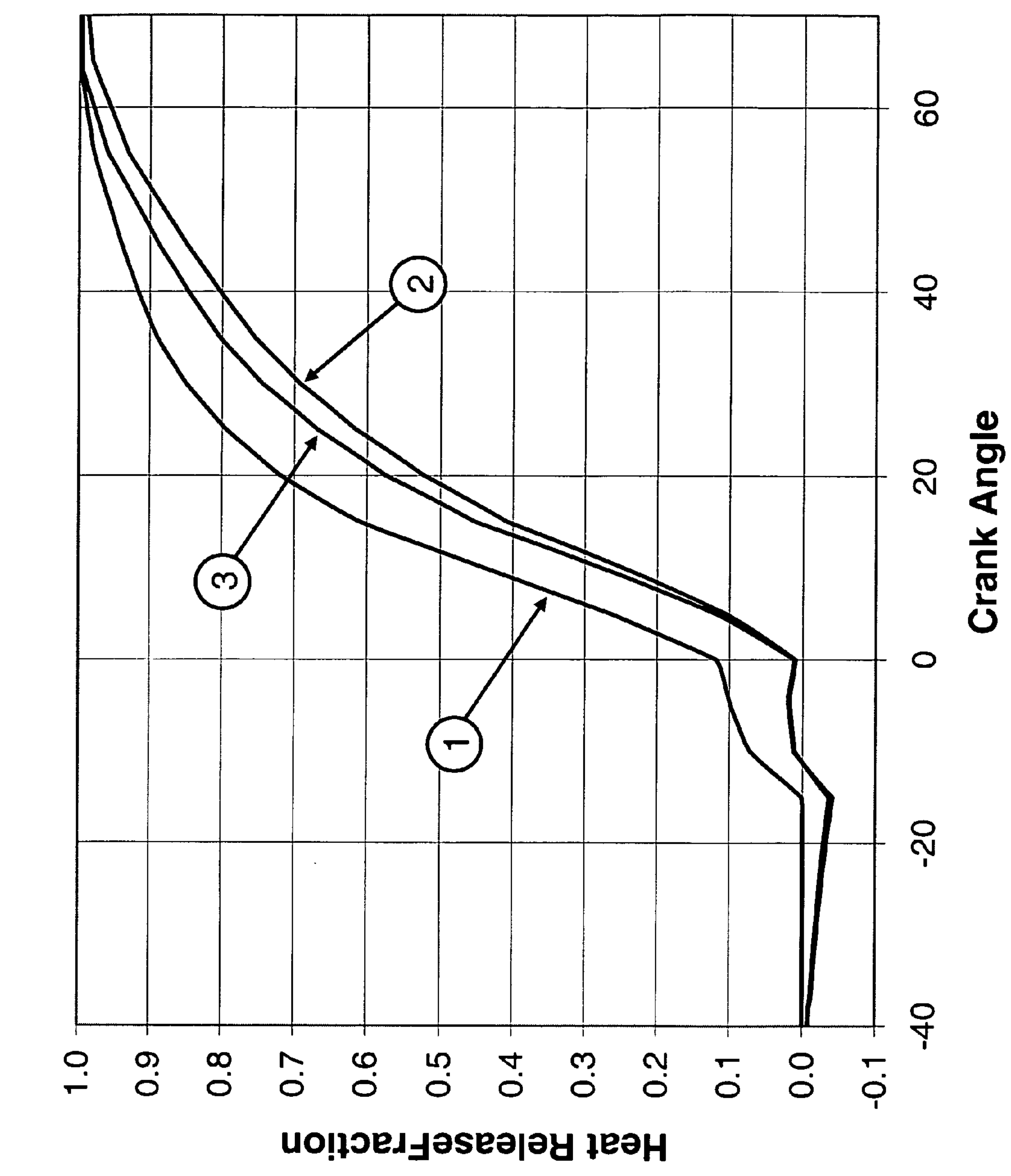
Figure 7 - Effect of Using Calculated Poly_Exp for Heat Release Calculation

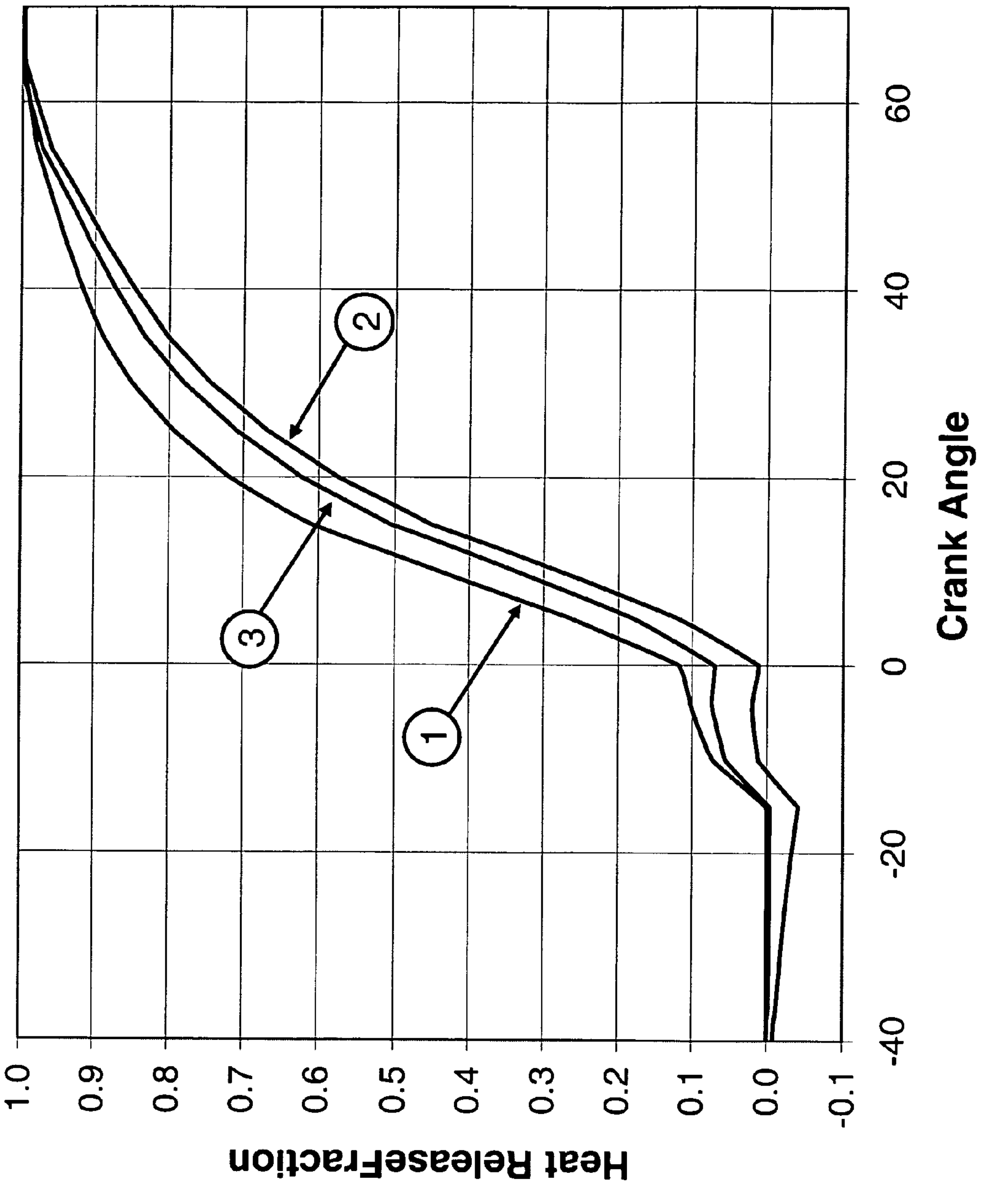
Figure 8 - Effect of Motoring Pressure Ratio Compensation

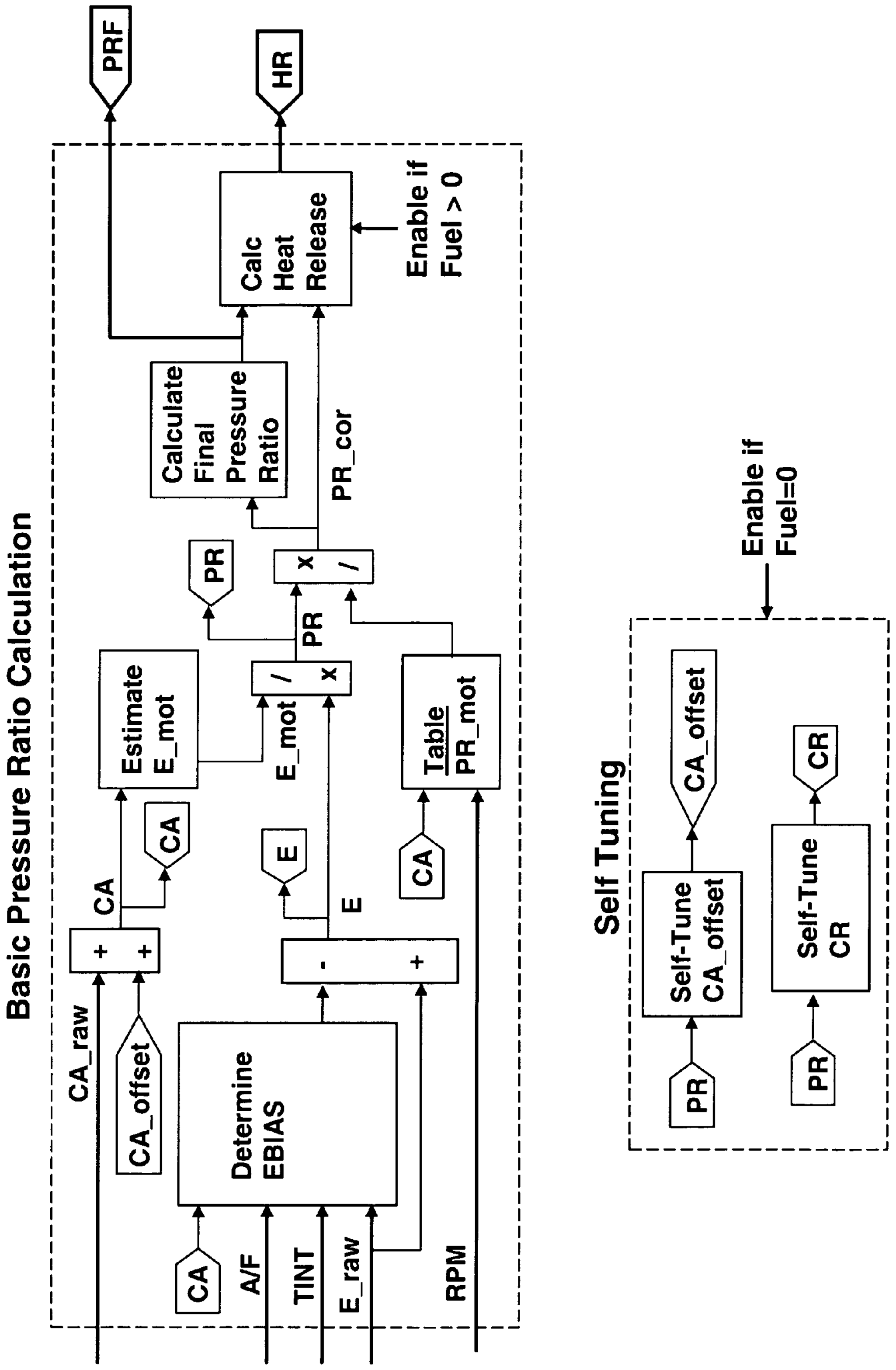
Figure 9 - Algorithm Overview

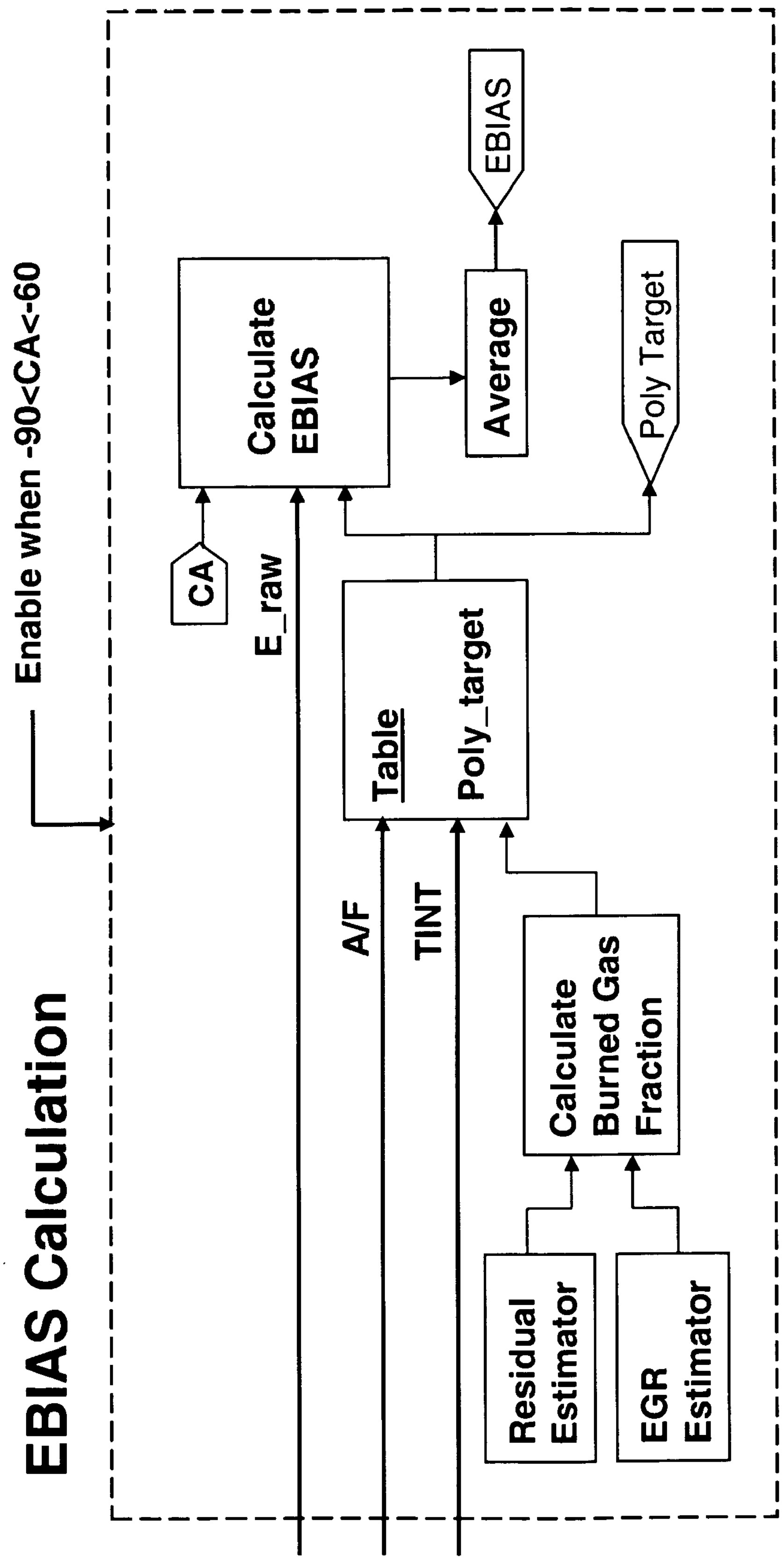
Figure 10 - Transducer Pegging Algorithm

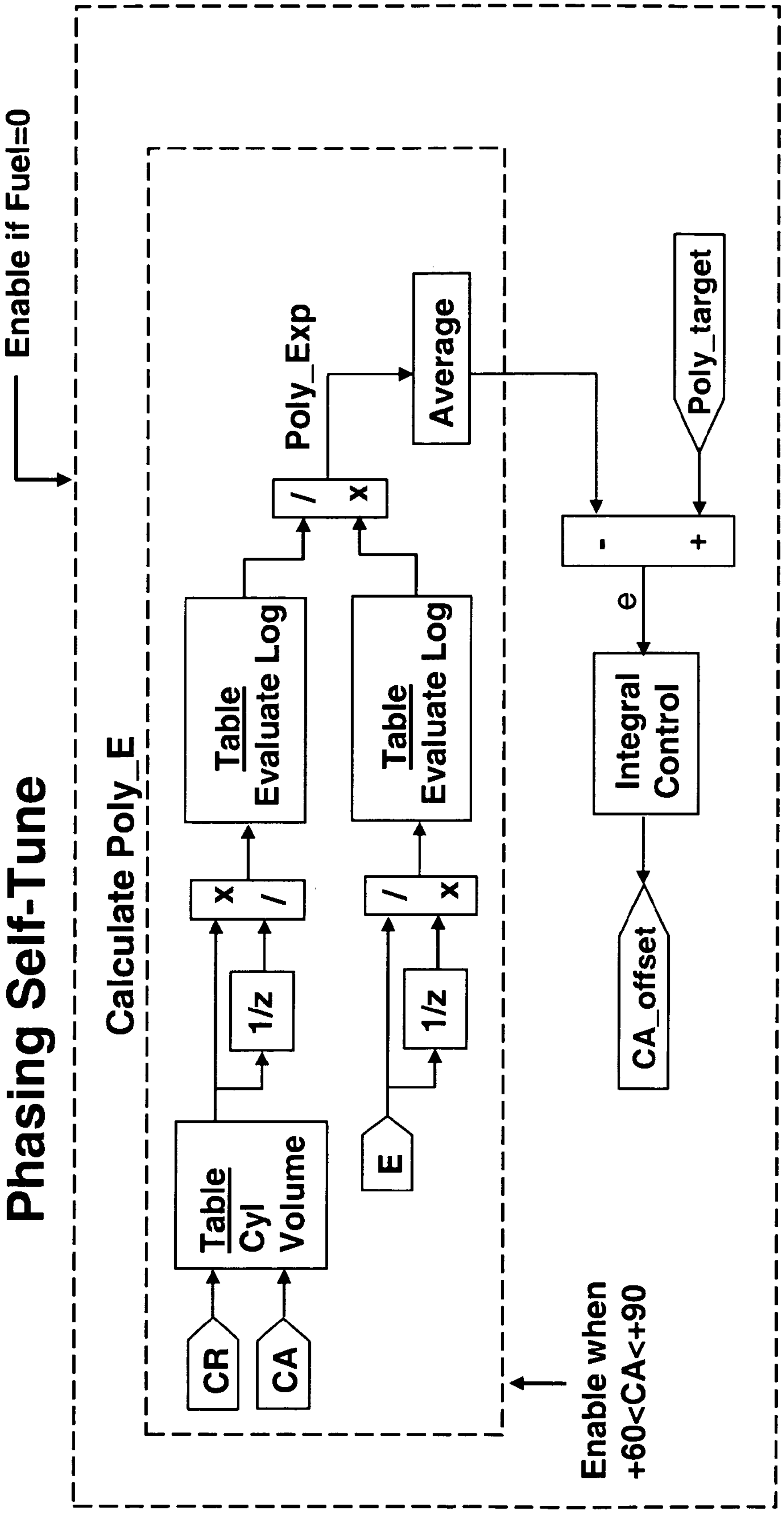
Figure 11 - Self-Tuning Algorithm for Phasing

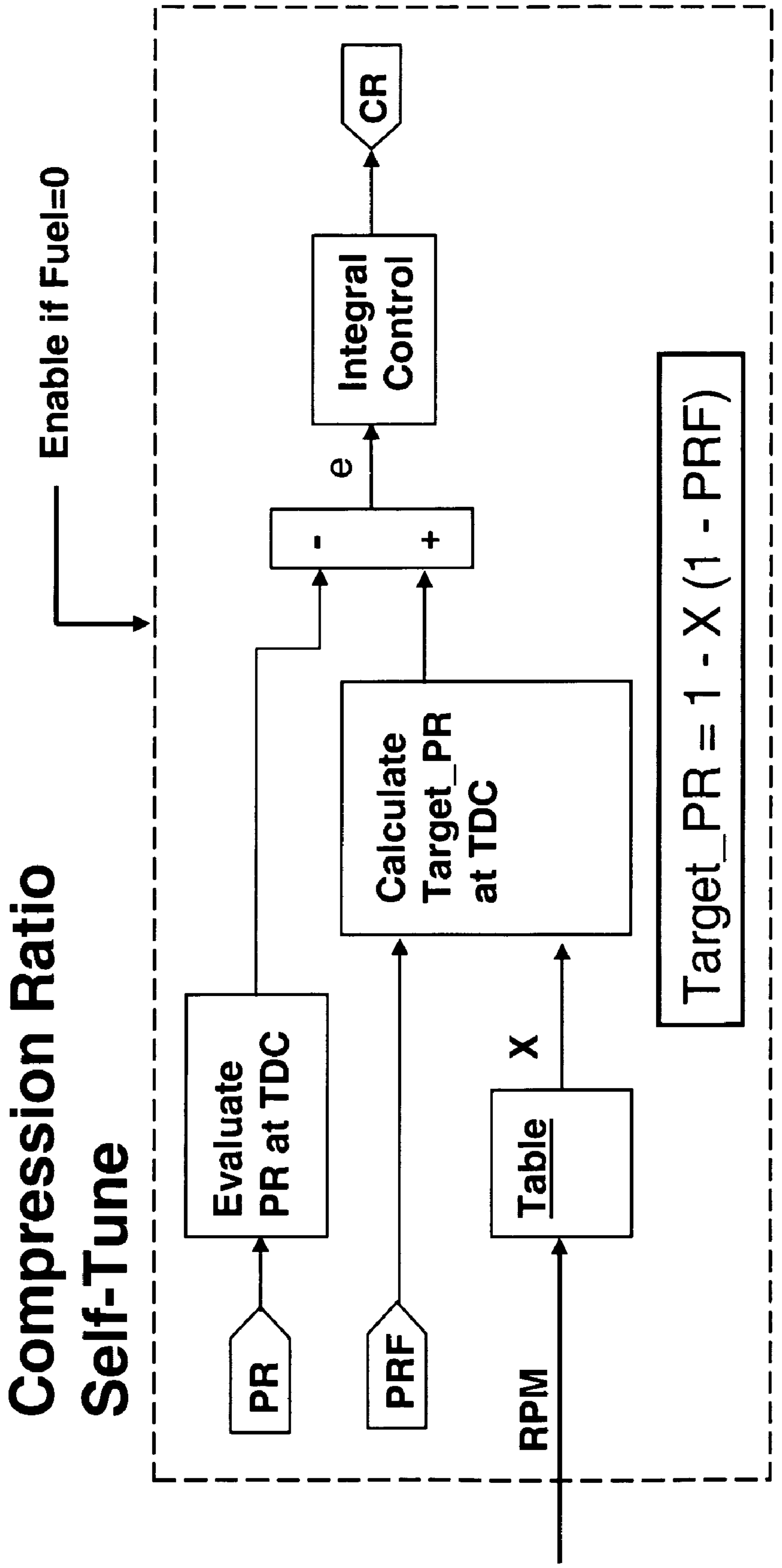
Figure 12 - Self-Tuning Algorithm for Compression Ratio

COMBUSTION CONTROL IN AN INTERNAL COMBUSTION ENGINE

TECHNICAL FIELD

The present invention relates to combustion control in an internal combustion engine.

BACKGROUND TO THE INVENTION

Traditionally, control of internal combustion engines has been based on the sensing of variables such as engine speed, intake manifold pressure, exhaust oxygen concentration, coolant temperature etc. and using these variables to adjust variables such as spark timing, exhaust gas recirculation rate, EGR, and fuel flow to a baseline engine condition that is measured on a test engine.

This approach has several drawbacks. Firstly, an engine will diverge from the baseline test engine due to production variation and component wear. Secondly, cylinder-to-cylinder variation may be significant. And thirdly, it appears that future engine combustion systems may render the traditional control approach inadequate.

An alternative approach is to implement a control system with the capability to adjust for changes in the individual engine cylinder operating characteristics. Such a control system is possible using cylinder pressure sensors and applying feedback control to ignition timing, dilution gas rate and fuel rate.

In a typical control system, there are three controlled parameters: spark timing (or fuel injection timing in a diesel engine), EGR rate and air/fuel ratio. The first parameter controls the timing of the ignition process and the other two parameters affect the speed and duration of the combustion process.

U.S. Pat. No. 4,622,939 (Matekunas et. al.) describes a control system for an internal combustion engine that uses pressure ratio management. The ratio of measured combustion chamber pressure to an estimated motoring pressure (i.e. the pressure within the cylinder when no fuel is being injected) is determined for a number of predetermined crankshaft rotational angles. These pressure ratios are used to control ignition timing for MBT (minimum ignition advance for best torque), EGR and fuel balance among combustion chambers.

Cylinder pressure within the Matekunas disclosure is determined via a pressure sensing transducer that produces a voltage that is linearly related to pressure. The voltage output signal of the transducer, $E_t$, is related to the pressure, P, by the following relationship:

$$E_t(\theta)=GP(\theta)+E\text{bias} \quad [1]$$

where G is the gain of the transducer which is assumed to be constant for a given engine cycle and Ebias is a voltage signal offset such that $E_t$−Ebias=0 when Pcyl=0, Pcyl being the absolute cylinder pressure.

It is assumed that prior to start of combustion the cylinder contents follow a polytropic process so that:

$$PV^n=\text{constant} \quad [2]$$

where P is the pressure, V is the volume of the cylinder and n is the polytropic exponent.

The Matekunas disclosure derives, from equations 1 and 2, an equation for Ebias that uses the pressure transducer signal sampled at two crank angle points during the compression stroke (but prior to the start of combustion) along with a specified value for the constant n. It is noted that the polytropic constant is assumed to be constant over the sampling interval and that a value for n is accurately known in advance. Specifically, Ebias is calculated using the following equations:

$$E\text{bias}=[E_t(\theta_1)-K2E_t(\theta_2)]/(1.0-K2) \quad [3]$$

$$K2=[V(\theta_1)/V(\theta_2)]^n \quad [4]$$

During combustion the motoring pressure values, which are required to calculate pressure ratio, cannot be measured, but can be estimated using the polytropic relation, equation 2. Normally the same value of the polytropic constant used to calculate Ebias is assumed. Pressure ratios thus calculated may be used to estimate several combustion related parameters, including combustion timing, duration and dilution level.

Upon the application of the teachings of U.S. Pat. No. 4,622,939 to diesel engines a number of disadvantages become apparent. Firstly, the thermodynamic properties of the working fluid during the expansion stroke of a diesel engine are significantly different from those during compression. This degrades the accuracy of the estimated motoring pressure during expansion.

Secondly, since diesel engines have higher rates of change of pressure, it becomes more important to synchronize cylinder volume with the pressure signal. It is noted that the polytropic relation, equation 2, will give accurate results only if the cylinder volume is correct. Cylinder volume may be calculated as a function of slider-crank geometry, compression ratio and crankshaft position. There is usually significant uncertainty in compression ratio and crank position, so engine control accuracy may be improved if the control algorithm can learn correct values.

Thirdly, compression temperatures within diesel engines are high (as a result of the high compression ratios). Error in the estimated motoring pressure is therefore caused by (a) heat transfer losses and (b) decreasing ratio of specific heats with increasing temperature.

It is therefore an object of the present invention to provide a control system, controller and associated control method that substantially overcomes or mitigates the above mentioned problems.

According to a first aspect of the present invention, there is provided a method of finding a voltage offset of a transducer used to measure pressure within an engine cylinder, the transducer being arranged to output a voltage signal $E_t(\theta)$ and having a voltage signal offset value Ebias at zero cylinder pressure and the contents of the engine cylinder undergoing a polytropic process, the method being comprised of the following steps;

a) measuring voltage output from the pressure transducer at least two crank angle values during the compression stroke;
b) calculating the volume of the cylinder at the crank positions where the voltage signals are measured;
c) calculating the ratio of specific heats for the cylinder contents;
d) using the values from (a), (b) and (c) to derive a value for the voltage signal offset Ebias.

The method according to the first aspect of the present invention provides a way of pegging a pressure transducer to find the voltage offset signal, Ebias, such that E−Ebias=0 at Pcyl=0, where E=pressure transducer voltage output and Pcyl=absolute cylinder pressure. In other words, the method allows recorded pressure data to be pegged (calibrated) to absolute cylinder pressure.

Conveniently the compression process may be modelled as a polytropic process, so the pressure, P, and volume, V, within the cylinder may be related by $PV^n$=constant, where n is the polytropic constant. The transducer output $E_t(\theta)$ may be defined by the relationship $E_t(\theta)=GP(\theta)+Ebias$, where G is the gain of the transducer, $P(\theta)$ is the pressure within the cylinder at a crank angle θ and Ebias is the voltage signal offset value. Using the results of steps (a), (b) and (c), these relations may be used to solve for Ebias. (Note: as used herein, the terms polytropic constant and polytropic exponent are interchangeable).

Conveniently, the cylinder may comprise a piston arranged for reciprocal motion and the measuring step of the method comprises measuring the voltage signal outputs during a crank angle window of 90 to 60 degrees before top dead centre of the piston cylinder.

Preferably, the ratio of specific heats is calculated during the above mentioned crank angle window as a function of gas temperature and composition, based on a model of the engine system, the model comprising estimates for gas temperature and composition.

Conveniently, the value of Ebias may be derived according to the following equation:

$$Ebias=[E_t(\theta_1)-K2E_t(\theta_2)]/(1.0-K2)$$

wherein $K2=[V(\theta_1)/V(\theta_2)]^k$, $\theta_1$ and $\theta_2$ are first and second crank angles, k is the ratio of specific heats calculated in step (c), $V(\theta)$ is the cylinder volume at crank angle θ and $E_t(\theta)$ is the transducer output signal at crank angle θ. The biased voltage signal, E, given by $E=E_t(\theta)-Ebias$ is henceforth used whenever a pressure or pressure ratio value is required.

According to a second aspect of the present invention, there is provided a method of correcting phasing errors between a voltage signal output of a pressure transducer used to measure pressure within an engine cylinder and the position of an engine crankshaft within an engine system, the contents of the engine cylinder undergoing a polytropic process such that $PV^n$=constant, where P=cylinder pressure, V=volume of the engine cylinder and n=polytropic constant, the method comprising:

a) calculating the ratio of specific heats for the engine cylinder contents;
b) measuring the pressure within the engine cylinder and calculating the volume of the cylinder for at least two different crankshaft positions during an expansion stroke;
c) calculating a value for the polytropic exponent, n, from the equation $PV^n$=constant using the values derived in step (b);
d) iteratively finding a crank angle phasing such that the value of n calculated in step (c) equals the ratio of specific heats calculated in step (a).

Preferably, the pressure measured in the measurement step is measured for a motoring engine, that is, when fuel is cut off during deceleration.

Preferably, the pressure measurement and volume calculation in step (b) are performed during a crank angle interval from 60 to 90 degrees after top dead centre.

Conveniently, n may be calculated from the following equation:

$$n=(\log E60-\log E90)/(\log V90-\log V60)$$

where E60, E90 are the biased voltage output from the transducer and V60, V90=cylinder volume at 60 and 90 degrees after top dead centre respectively.

According to a third aspect of the present invention, there is provided a method of determining the compression ratio of an engine, the method comprising:

a) measuring the pressure ratio of a cylinder within the engine near the end of an expansion stroke in order to derive a final pressure ratio, PRF;
b) calculating the pressure ratio of the cylinder at top dead centre;
c) varying the compression ratio of the engine used in the calculation of step (b) until the pressure ratio at top dead centre, PR(TDC), is a target fraction of the final pressure ratio.

Preferably, the pressure ratios calculated in steps (a) and (c) are based on cylinder pressure measurements on a motored engine.

Preferably, the final pressure ratio is derived by averaging the calculated pressure ratios over a crank angle interval from 60 to 90 degrees after top dead centre.

Conveniently, the compression ratio is varied as in step (c) until $$PR(TDC)=\text{Target } PR(TDC) \text{ and}$$

$$\text{Target } PR(TDC)=1-X(1-PRF) \text{ where X is the target fraction.}$$

According to a fourth aspect of the present invention, there is provided a method of improving the accuracy of the calculation of heat release fraction for a cylinder in a firing engine, the contents of the engine cylinder undergoing a polytropic process such that $PV^n$=constant, where P=cylinder pressure, V=volume of the engine cylinder and n=polytropic constant and the method comprising the steps of:

a) calculating the expansion polytropic exponent, poly_exp, for the firing engine;
b) calculating the compression polytropic exponent, poly_comp;
c) calculating an estimated motoring pressure using the polytropic relation, $PV^n$=constant, with polytropic exponents determined in step (a) for crank angle values after-top-centre, and in step (b) for crank angles before-top-centre;
d) calculating pressure ratio given by PR=(measured pressure)/(estimated motoring pressure), using estimated motoring pressures calculated in step (c);
e) calculating the final pressure ratio, PRF, by averaging pressure ratio values late in the expansion stroke;
f) calculating heat release fraction, HRF, according to $$HRF=(PR-1)/(PRF-1)$$

The calculation of poly_exp in step (a) and PRF in step (e) are performed by averaging over a crank angle interval that begins after combustion is complete, and ends before the exhaust valve opens.

The value for poly_comp in step (b) is set equal to the value of the ratio of specific heats calculated as described in the first aspect of the invention.

According to a fifth aspect of the present invention, there is provided a method of calculating the heat release fraction for a cylinder in a firing engine, the method comprising:

a) calculating the motoring pressure ratio, PR_mot, of the engine according to the equation: PR=measured motored pressure (θ)/estimated motored pressure (θ), where θ is the crank angle and the estimated motored pressure being derived from $PV^n$=constant, where P=cylinder pressure, V=cylinder volume and n=polytropic exponent, n being set equal to the ratio of specific heats of the contents of the cylinder;

b) calculating the pressure ratio of the motoring engine at the end of an expansion stroke, PRF_mot;

c) calculating the heat release fraction according to:

$$HRF=(PR\_cor-1)/(PRF\_cor-1)$$

where PR_cor=PR/PR_mot, PRF_cor–PRF/PRF_mot and PR is the ratio of measured firing cylinder pressure to estimated motoring pressure and the final pressure ratio PRF is evaluated after combustion is complete.

The method according to the fifth aspect of the present invention provides a method of calculating the heat release fraction for a cylinder in a firing engine that reduces the error due to heat transfer losses.

According to a sixth aspect of the present invention, there is provided a carrier medium for carrying a computer readable code for controlling a controller or engine control unit to carry out the methods of any of the first, second, third, fourth or fifth aspects of the invention.

The seventh, eighth and ninth aspects of the invention relate to apparatus suitable for carrying out the methods of the first, second and third aspects of the invention respectively.

According to a seventh aspect of the present invention, there is provided a device for pegging, or finding the voltage offset, Ebias, of a transducer used to measure pressure within an engine cylinder, the transducer being arranged to output a voltage signal $E_t(\theta)$ and having a voltage signal offset value Ebias at zero cylinder pressure and the cylinder contents undergoing a polytropic process, the device comprising:

input means for receiving at least two measured voltage signal outputs from the transducer;

processing means arranged to calculate the ratio of specific heats for the cylinder contents; calculate the volume of the cylinder at the points the voltage signals are measured and to subsequently derive a value for the voltage signal offset Ebias.

According to an eighth aspect of the present invention, there is provided a device for correcting phasing errors between a voltage signal output of a pressure transducer used to measure pressure within an engine cylinder and the position of an engine crankshaft within an engine system, the contents of the engine cylinder undergoing a polytropic process such that $PV^n$=constant, where P=cylinder pressure, V=volume of the engine cylinder and n=polytropic constant, the device comprising:

input means for receiving at least two measured voltage signal outputs from the transducer;

processing means arranged to a) calculate the ratio of specific heats for the cylinder contents; b) calculate the volume of the cylinder from an engine model for at least two different crankshaft positions; c) calculate a value for the polytropic exponent, n, from the equation $PV^n$=constant using the values of V derived in (b); and d) iteratively vary the phasing until the value for n calculated in (c) equals the ratio of specific heats calculated in (a).

According to an ninth aspect of the present invention, there is provided a device for determining the compression ratio of an engine comprising:

input means for receiving data related to the pressure ratio of a cylinder near the end of an expansion stroke;

processing means arranged to derive a final pressure ratio, PRF, from data received by the input means; calculate the pressure ratio of the cylinder at top dead centre; and to vary the compression ratio of the engine used in the calculation of pressure ratio at top dead centre until the pressure ratio at top dead centre, PR(TDC), is a target fraction of the final pressure ratio.

The invention extends to an engine control unit for a vehicle and a vehicle comprising a controller according to the first to fifth aspects of the present invention. The invention further extends to an apparatus corresponding to the fourth and fifth aspects of the present invention.

BRIEF DESCRIPTION OF THE DRAWINGS

In order that the invention may be more readily understood, reference will now be made, by way of example, to the accompanying drawings in which:

FIG. 1 is a schematic diagram of an engine with a control according to embodiments of the present invention;

FIG. 2 is a plot of log P versus log V for a motoring diesel engine;

FIG. 3 is a plot of cylinder heat transfer rate as a function of crank angle for a motoring diesel engine;

FIG. 4 is a plot of polytropic constant and specific heat ratio as a function of crank angle for a motoring diesel engine;

FIG. 5 shows the effect of phase and compression ratio errors on the pressure ratio as a function of crank angle for a motoring diesel engine;

FIG. 6 is a plot of pressure ratio as a function of crank angle for a motoring diesel engine having various compression ratios;

FIG. 7 is a plot of heat release fraction as a function of crank angle for various polytropic exponent values;

FIG. 8 is a further plot of heat release fraction as a function of crank angle;

FIG. 9 is an overview of a control algorithm for a control system in accordance with an embodiment of the present invention;

FIG. 10 is an algorithm for a method of pegging the pressure transducer in accordance with an embodiment of the present invention;

FIG. 11 is an algorithm for learning the phasing error within the engine system in accordance with an embodiment of the present invention, and;

FIG. 12 is an algorithm for deriving the compression ratio of the engine system in accordance with an embodiment of the present invention.

DETAILED DESCRIPTION

FIG. 1 details an internal combustion engine that may operate according to the principles of the present invention. In the Figure, an engine (generally indicated by reference numeral 1) is shown, the engine having four cylinders 3. Although FIG. 1 shows four cylinders, the present invention may be applied to an engine with any number of cylinders. The engine further comprises an intake manifold 5 and an exhaust manifold 7. Each cylinder is provided with an intake valve 11 (which is in communication with the intake manifold 5) and an exhaust valve 13 (in communication with the exhaust manifold 7). Each cylinder is also provided with an injector 15 and a pressure sensor/transducer 17.

A computer 19 is provided with inputs to receive data (P1, P2, P3, P4) from the pressure sensors 17 and outputs to send control signals (F1, F2, F3, F4) to the injectors 15.

A crank position sensor 21 is provided to provide data to the computer 19 indicative of rotation of the crankshaft 23.

An exhaust gas recirculation valve 25 (EGR valve) controls the flow of diluent gases back to the intake manifold 5.

As noted above the present invention provides a means of mitigating the problems with the prior art control systems. In order to do this, however, the pressure transducer used to measure the pressure within the engine system must be accurately pegged. This process consists of finding a value for the voltage signal offset, Ebias, such that $E_r$–Ebias=0 when Pcyl=0, Pcyl being the absolute cylinder pressure.

In Matekunas, a value for Ebias was derived by assuming that the polytropic exponent, n, was nearly constant over a sampling interval and that the value of this constant was well and accurately known. The process described therein required that the transducer signal be sampled at two crank angle points during the compression stroke prior to combustion.

In a first aspect of the embodiment of the present invention, the polytropic constant is accurately determined during an optimal crank angle interval. This then allows the pressure transducer to be more accurately pegged.

FIG. 2 shows a log pressure versus log volume plot for a motoring diesel engine (that is to say the pressure within an engine cylinder when the fuel injectors are not injecting fuel into the engine). It is noted that around mid stroke (between a crank angle of about 90 to 60 before top dead centre (BTDC) during compression and from about 60 to 90 degrees after top dead centre (ATDC) during expansion) the plot lines are straight and parallel like an ideal polytropic process.

FIG. 3 shows a plot of heat transfer rate versus crank angle. It is noted that during the crank angle ranges identified above, the heat transfer rate is very small, which implies that in these crank angle ranges, the slopes of both the compression and expansion lines in FIG. 2, which is the polytropic constant, are equal to the ratio of specific heats.

FIG. 4 shows a plot of polytropic constant and specific heat ratio with respect to crank angle. It is noted that in the crank angle range described above the polytropic constant is substantially equal to the ratio of specific heats for both the expansion and compression strokes.

The ratio of specific heats is a function of temperature, air-fuel ratio and burned gas fraction. It is noted that accurate values for the specific heats of the mixture within the cylinder can be determined using a table or equations embedded in the engine controller.

It follows from the above discussion therefore that the pressure transducer can be accurately pegged by performing the following steps:

1) Calculating a value for the polytropic constant, n, by calculating the ratio of specific heats of the cylinder gas mixture and setting the calculated value equal to n;
2) Solving Equations 3 and 4 by measuring the voltage output signal of the transducer, $E_r$, at least two different points within a crank angle window between 90 to 60 degrees before top dead centre.

In practice the effects of noise on the pressure transducer signal can be reduced by calculating several values for Ebias using several sub-intervals within the 90-to-60 degree window, then averaging.

Once Ebias is determined, cylinder pressure is then proportional to the biased, transducer voltage, E(θ), given by $E_r$–Ebias. Since only pressure ratios are of interest, a voltage ratio may be used in place of pressure ratio. Therefore, henceforth whenever the calculation of pressure ratio is mentioned, it will be understood that calculation is actually performed as the ratio of voltages.

As noted above, a cylinder volume must be provided for each pressure transducer sample. This is done by sampling an engine crank angle encoder signal and using this value, along with known engine geometrical parameters, to calculate cylinder volume. In a real engine application, there is significant uncertainty in the value of crank position so that the pressure signal may be out of synchronization relative to the calculated volume. The error in crank position will henceforth be referred to as "phase error" or "crankangle offset." Similarly, the compression ratio of the engine may also be uncertain. This also will cause an error in calculated cylinder volume. It is noted that these effects can vary from engine-to-engine and cylinder-to-cylinder and will also drift with age.

Therefore, in a second, further aspect of the present invention there is provided a method of deriving and correcting the phase error and a method of deriving the compression ratio of the engine.

This aspect of the present invention relates to a self tuning procedure which is based on a pressure ratio analysis of the motored cylinder pressure sampled during deceleration fuel cut-off.

The self tuning method for phasing error utilises the fact (noted above in relation to FIG. 1) that the compression and expansion lines of the motoring Log P-Log V plot are parallel at approximately mid-stroke, that is, between 60-90 degrees of crank angle, both BTDC and ATDC. As noted in FIG. 3, the values for the ratio of specific heats and the polytropic constant are also equal during these crank angle intervals. The polytropic exponent for compression is forced to equal the known ratio of specific heats by the Ebias calculation procedure. However, the expansion value (i.e. the polytropic exponent value for the expansion phase) may be calculated using the pressure transducer signal by the following equation derived from Equation 2:

$$n=(\log E60-\log E90)/(\log V90-\log V60) \quad [5]$$

where E60, E90=biased voltage signal output from the transducer and V60, V90=cylinder volume at 60 and 90 degrees after top dead centre respectively.

It is noted that the cylinder volume is calculated as a function of both crank angle and compression ratio, so that error in either will affect the calculated value of n for expansion.

In the second and third aspects of the present invention, the crank angle offset (Φ) and the compression ratio (CR), respectively, of the engine are derived via an iterative process.

The method of deriving CR and Φ is described below but it is first noted with reference to FIGS. 5 and 6 that the iterative process is stable and convergent.

FIG. 5 shows the pressure ratio within the cylinder as affected by errors in phasing (Φ) and compression ratio (CR). It is noted that the plots within FIG. 4 have been calculated from the same pressure data used to generate FIGS. 2 to 4.

The pressure ratio within the cylinder is defined as the ratio of measured pressure to estimated (or theoretical) motored pressure, the estimated pressure being calculated using Equation 2 with the same polytropic exponent used for Ebias.

$$PR=\text{measured motored pressure }(\theta)/\text{estimated motored pressure }(\theta) \quad [6]$$

where θ is the crank angle.

It is noted that the pressure ratio is a function of the compression ratio, CR, of the engine and also the polytropic exponent. The actual pressure within the engine can be accurately determined since the pressure transducer has been accurately pegged by virtue of the method of the first aspect of the invention.

Turning to FIG. 5, seven different pressure ratio curves are shown for various compression ratio and phase values. For each case the polytropic exponent for expansion is calculated using Equation [5]. Curves labelled 1, 2, and 3 show the effect of CR error with a phase error of −0.5 degree. Curve 2 has correct CR and curves 1 and 3 are for CR values 1.0 above and below correct CR, respectively. Likewise curves 5, 6 and 7 show CR variation with a phase error of +0.5 degree. Curve 4 is calculated using the correct values for both compression ratio and phase This curve drops below 1.0 because of heat transfer losses which are not accounted for in the estimated (polytropic) motoring pressure calculation.

Since the pressure transducer has been pegged, the pressure ratio in the −90 to −60 degree window is 1.0 for all cases (since the measured motored pressure will equal the estimated motored pressure by virtue of the pegging procedure).

From FIG. 5 the following points are noted:

1) Variations in the value for the compression ratio generally effect the pressure ratio curves in the range 60 degrees BTDC to 60 ATDC. This is because the calculated volume is most sensitive to compression ratio in the region near TDC.
2) Pressure ratio is more sensitive to phasing errors for crank angles above 60 degrees ATDC. This is because calculated volume is most sensitive to phase in this crank angle range.
3) When the phasing of the pressure transducer signal to the calculated volume of the cylinder is correct, the calculated value of the polytropic exponent is equal to the value used for the pressure transducer pegging procedure described above.

FIG. 6 shows the pressure ratio as a function of crank angle for various compression ratios, but using correct phase in all three cases. Curve 2 has correct CR, while curves 1 and 2 have CR values 1.0 too high and low, respectively. It is noted that the correct trace varies smoothly and monotonically toward a final value by around 60 degrees ATDC. It is noted that the compression ratio may therefore be estimated by finding the compression ratio value that places the pressure ratio calculated at top dead centre at a calibratable fraction of the difference between the initial and final pressure ratios, i.e.

$$\text{Target}\_PR(@TDC)=1-X(1-PRF) \qquad [7]$$

where PRF=final pressure ratio and X=target fraction.

The above mentioned observations with respect to FIGS. 5 and 6 above lead to methods for determining the compression ratio (CR) and phasing (Φ) of the engine via an iterative process.

Accordingly, the second and third aspects of the invention provides a self tuning procedure comprising of the following steps:

1) An initial value for the compression ratio is assumed. It is noted that since the phase value is relatively insensitive to the assumed compression ratio, this assumption will allow the iterative procedure for phase estimation described below to converge.
2) With CR fixed, the value for the phasing (Φ) is varied until the polytropic exponent value for expansion, calculated using equation [5] is equal to the value for n used in the pressure transducer pegging procedure.
3) The final pressure ratio, PRF, is calculated by averaging the motored pressure ratio in the 60 to 90 degree ATDC window.
4) The compression ratio is iterated from the assumed initial value until the pressure ratio calculated at top dead centre is at a target value relative to the final pressure ratio calculated in step 3.
5) Steps 2 to 4 may then be repeated with the new value for CR.

It is noted that in practice the above iterations may successfully be performed by varying CR and Φ simultaneously, since the two variables affect different parts of the pressure ratio curve.

As explained in the Matekunas disclosure, the pressure ratio for firing engine cycles is an approximate image of the heat released during combustion, so that a curve of heat release fraction as a function of crank angle may be derived by normalizing the pressure ratio curve to vary from 0 to 1 using the following equation:

$$HRF=(PR-1)/(PRF-1) \qquad [8]$$

For firing cycles the final pressure ratio, PRF, is evaluated after combustion is complete, usually after 90 degrees ATDC. The pressure ratio, PR, is the ratio of measured firing cylinder pressure to estimated motoring pressure. FIG. 6 shows heat release fraction so calculated, along with the actual heat release for comparison.

For firing cycles in engines with direct cylinder injection, such as diesel engines, the ratio of specific heats of the burned gas during expansion is usually significantly different from that of the unburned gas during compression. This can lead to significant error in the estimated motoring pressure during expansion. Using a value for the polytropic constant during expansion that is calculated from the measured pressure using equation [5] can reduce this error. This comprises the fourth aspect of the present invention. FIG. 7 shows the improvement in the pressure-ratio-based heat release estimate obtained by implementing this compensation. Curve 1 is the actual heat release, curve 2 is the estimated heat release assuming poly_exp equal to poly_comp, and curve 3 is the estimated heat release using calculated poly_exp.

It was noted above that for motoring cycles, the actual motoring pressure ratio falls below the estimated pressure ratio because of heat transfer losses. This under-estimation introduces an error in the pressure ratio calculation and, consequently, also in the heat release calculation for firing cycles. Adjusting the estimated motoring pressure based on a measured motoring pressure ratio can reduce this error. The measured motoring pressure ratio is obtained by averaging and storing pressure ratio curves obtained during deceleration fuel cut off (the same data used for the self tuning process described above).

The compensation is performed using the following steps, thus comprising the fifth aspect of the present invention:

1) Calculate PR and PRF using measured firing cylinder pressure and estimated motoring pressures.
2) Calculate corrected values of pressure ratio and final pressure ratio using the following equations:

$$PR\_cor=PR/PR\_mot$$

$$PRF\_cor=PRF/PRF\_mot$$

Where PR_mot is the stored motoring pressure ratio described previously, and PRF_mot is the final pressure ratio of the stored motoring pressure ratio curve. In place of PR and PRF in equation [8], "corrected" values are used instead.

3) Calculate a "corrected" heat release fraction using $$HRF\_cor=(PR\_cor-1)/(PRF\_cor-1) \qquad [9]$$

FIG. 8 shows the effect of applying this correction. Curve 1 is the actual heat release, curve 2 is same as curve 3 of FIG. 6, and curve 3 is the estimated heat release using motoring pressure ratio compensation. The improvement is most apparent prior to top dead centre and the pilot combustion profile is much less distorted. Most of the remaining difference between the actual heat release fraction and the pressure ratio based heat release estimate is due to heat absorbed by liquid fuel heating and evaporation.

FIGS. 9 to 12 depict algorithms to implement the above procedures.

FIG. 9 provides an overview of the algorithm. FIG. 10 is a flow chart showing how EBIAS is calculated. FIG. 11 is a flow chart that details how the phasing errors within the system are determined (the Self Tuning Block) and FIG. 12 is a flowchart that shows how the compression ratio is determined.

FIG. 9 shows an overall flow chart of the pressure ratio management (PRM) algorithm.

The primary inputs to the basic Pressure Ratio Calculation Block are:

1) Raw crank encoder signal, CA_raw, which will have some error to be corrected by adding CA_offset, the correction calculated by the Self-Tuning Block.
2) Raw pressure transducer voltage, E_raw (before the EBIAS is applied).
3) Air-fuel ratio, A/F, estimated by another EMS function.
4) Intake air temperature, TINT, either measured or estimated by a separate EMS function.
5) Engine speed, RPM.

An additional input, CA_offset, which is the phasing correction, comes from the Self-Tuning Block. CA_offset is added to CA_raw to get the true crank angle, CA. CA is used at several points in the algorithm.

CA is used to calculate cylinder volume, which is then used to calculate an estimate of motoring voltage, E_mot.

EBIAS (from the EBIAS Block, FIG. 10) is subtracted from E_raw to get a pegged pressure transducer voltage, which is then divided by E_mot to obtain the pressure ratio, PR. Note that only the voltage ratio is needed. Actual pressure values never appear because only pressure ratio (which is equal to the voltage ratio, assuming a linear transducer) is of interest.

PR is then divided by the motoring pressure ratio, PR_mot, to obtain the corrected pressure ratio, PR_cor. The table of PR_mot values may be populated as a function of RPM and CA using a block-learn procedure during fuel cutoff. PR_cor is then processed to find the final pressure ratio, PRF. PRF values are averaged over a crank angle interval following completion of combustion, typically 90 to 110 degrees ATDC.

The heat release curve is estimated using PR_cor and PRF using equation 9.

The two primary outputs are then:

1) Final pressure ratio, PRF. This may be used to modify the quantity of fuel injected on an individual cylinder basis for cylinder output balancing.
2) Heat release profile, HR. This may be used to adjust fuel injection in order to maintain desired combustion timing and heat release profile shape, and correct pilot timing and quantity.

There are three secondary outputs that are needed by other parts of the algorithm. These are:

1) Phase corrected crank angle, CA, which is used to calculate cylinder volume in the EBIAS Block and in the Phasing Self-Tune Block.
2) Pegged pressure transducer voltage, E.
3) Pressure ratio, PR, (without the PR_mot correction).

The pressure ratio calculations are performed and applied on an individual cylinder basis.

FIG. 10 shows a flow chart of the EBIAS calculation. The calculation is enabled only during the crank angle interval 90 to 60 degrees BTDC. The inputs are:

1) Phase corrected crank angle, CA. This is used to calculate cylinder volume.
2) Raw pressure transducer voltage.
3) Air-fuel ratio, A/F.
4) Intake air temperature, TINT.

A/F and TINT are used, along with values for residual gas fraction and EGR fraction (estimated in a separate EMS function) to calculate the ratio of specific heats of the cylinder contents. This is then used as the polytropic exponent value in equation 4, and also as the target value of polytropic exponent in the Phasing Self-Tune Block. EBIAS values are averaged over the 90 to 60 degree BTDC interval.

FIG. 11 shows a flow chart for Phasing Self-Tune. The calculation is enabled only for motoring engine cycles (fuel=0). The inputs, all of which are calculated in other parts of the algorithm, are:

1) Compression ratio, CR.
2) Phase-corrected crank angle, CA.
3) Pegged (biased) pressure transducer voltage, E.
4) Target value for polytropic exponent, Poly_target.

Inputs 1 to 3 are used to calculate Poly_Exp using equation 5. This calculation is enabled only during the 90 to 60 degree ABDC interval, over which the values are averaged.

An error, e, is the difference between Poly_Exp and the target value. An integral controller finds the CA_offset value such that Poly_Exp=Poly_target. CA_offset is outputted for use as a phase correction (see FIG. 10).

FIG. 12 shows a flowchart for Compression Ratio Self-Tune. The calculation is enabled only for motoring engine cycles (fuel=0). The inputs are:

1) Pressure ratio, PR, (without PR_mot correction).
2) Final pressure ratio, PRF.
3) Engine speed, RPM.

The target fraction, X, is tabulated as a function of RPM because heat loss, which is sensitive to engine speed, affects its value. A target value for motoring pressure ratio at TDC is determined using equation 7. The error, e, is the difference between the actual and target values of PR at TDC. An integral controller finds the compression ratio value, CR, such that PR@TDC=Target_PR.

CR is outputted for use in the cylinder volume calculations.

It will be understood that the embodiments described above are given by way of example only and are not intended to limit the invention, the scope of which is defined in the appended claims. It will also be understood that the embodiments described may be used individually or in combination.

The invention claimed is:

1. A method of finding a voltage offset of a transducer used to measure pressure within an engine cylinder, the transducer being arranged to output a voltage signal Et(θ) and having a voltage signal offset value Ebias at zero cylinder pressure and the contents of the engine cylinder undergoing a polytropic process, the method comprising:

a) calculating the ratio of specific heats for the cylinder contents;

b) measuring at least two voltage signal outputs from the transducer;

c) calculating the volume of the cylinder at the points the voltage signals are measured;

d) using the values from (a), (b) and (c) to derive a value for the voltage signal offset Ebias.

2. A method as claimed in claim 1, wherein the pressure, P, and volume, V, within the cylinder are defined by a polytropic relationship, PVn=constant, where n is the polytropic constant, and the transducer output Et(θ) is defined by the relationship Et(θ)=GP(θ)+Ebias, where G is the gain of the transducer, P(θ) is the pressure within the cylinder at a crank angle θ and Ebias is the voltage signal offset value, wherein: the polytropic constant, n, is set equal to the ratio of specific heats calculated in step (a), and step (d) of the method comprises solving these relationships for Ebias.

3. A method as claimed in claim 1, wherein the cylinder comprises a piston arranged for reciprocal motion and step (b) of the method comprises measuring the voltage signal outputs during a crank angle window of 90 to 60 degrees before top dead centre of the piston cylinder.

4. A method as claimed in claim 2, wherein the cylinder comprises a piston arranged for reciprocal motion and step (b) of the method comprises measuring the voltage signal outputs during a crank angle window of 90 to 60 degrees before top dead centre of the piston cylinder.

5. A method as claimed in claim 1, wherein the engine cylinder comprises an intake valve and transducer measurements are taken after closure of the intake valve and before start of combustion.

6. A method as claimed in claim 1, wherein the ratio of specific heats, k, is calculated based on a model of the engine system, the model comprising estimates for gas temperature and composition.

7. A method as claimed in claim 1, wherein the value of Ebias is derived according to the following equation:

$$E\text{bias}=[Et(\theta 1)-K2Et(\theta 2)]/(1.0-K2)$$

wherein K2=[V(θ1)/V(θ2)]k, θ1 and θ2 are first and second crank angles, K is the ratio of specific heats, V(θ) is the cylinder volume at crank angle θ and Et(θ) is the transducer output signal at crank angle θ.

8. A carrier medium for carrying a computer readable code for controlling a controller or engine control unit to carry out the method of claim 1.

9. A device for finding a voltage offset of a transducer used to measure pressure within an engine cylinder, the transducer being arranged to oulput a voltage signal Et(θ) and basting a voltage signal offset value Ebias at zero cylinder pressure and the contents of the engine cylinder undergoing a polytropic process, the device comprising:

input means for receiving at least two measured voltage signal outputs from the transducer;

processing means arranged to calculate the ratio of specific heats for the cylinder contents; calculate the volume of the cylinder at the point the voltage signals are measured and to subsequently derive a value for the voltage signal offset Ebias.

* * * * *